US008639961B2

(12) United States Patent
Doerksen et al.

(10) Patent No.: US 8,639,961 B2
(45) Date of Patent: Jan. 28, 2014

(54) PARTICIPANT RESPONSE SYSTEM EMPLOYING BATTERY POWERED, WIRELESS REMOTE UNITS

(75) Inventors: Hannah Doerksen, Calgary (CA); Michael Boyle, Calgary (CA)

(73) Assignee: SMART Technologies ULC (CA)

( * ) Notice: Subject to any disclaimer, the term of this patent is extended or adjusted under 35 U.S.C. 154(b) by 884 days.

(21) Appl. No.: 12/522,737

(22) PCT Filed: Jan. 10, 2008

(86) PCT No.: PCT/CA2008/000038
§ 371 (c)(1),
(2), (4) Date: May 27, 2010

(87) PCT Pub. No.: WO2008/083486
PCT Pub. Date: Jul. 17, 2008

(65) Prior Publication Data
US 2010/0281287 A1    Nov. 4, 2010

Related U.S. Application Data

(60) Provisional application No. 60/879,571, filed on Jan. 10, 2007.

(51) Int. Cl.
*G06F 1/28* (2006.01)
(52) U.S. Cl.
USPC ............................. 713/340; 434/351; 702/63
(58) Field of Classification Search
USPC ............................. 702/63; 713/340; 434/351
See application file for complete search history.

(56) References Cited

U.S. PATENT DOCUMENTS

| 6,178,527 | B1 | 1/2001 | Vidales |
| 6,459,896 | B1 | 10/2002 | Liebenow |
| 2003/0215780 | A1 | 11/2003 | Saar et al. |
| 2004/0033478 | A1 | 2/2004 | Knowles |
| 2005/0027466 | A1* | 2/2005 | Steinmetz et al. ............ 702/63 |
| 2006/0121951 | A1 | 6/2006 | Perdomo et al. |
| 2006/0293048 | A1 | 12/2006 | Swanson et al. |
| 2007/0123287 | A1* | 5/2007 | Mock et al. .................. 455/518 |

FOREIGN PATENT DOCUMENTS

WO    WO 03/060746 A1    7/2003

OTHER PUBLICATIONS

Petr, David W. "Experience with a Multiple-Choice Audience Response System in an Engineering Classroom". Proceedings of the 35th AEEE/IEEE Frontiers in Education Conference, Oct. 19-22, 2005. Indianapolis, Indiana, U.S.A.
International Search Report for PCT/CA2008/00038.
Office Action for Chinese Patent Application No. 200880002099.1 with a mailing date of Nov. 30, 2010.
Extended European Search Report for European Patent Application No. 08 70 0505, with a mailing date of Jun. 6, 2011.
Examiner's first report on patent application No. 2008204689 with a mailing date of Sep. 1, 2011.

(Continued)

*Primary Examiner* — Albert Wang
(74) *Attorney, Agent, or Firm* — Katten Muchin Rosenman LLP (57) ABSTRACT

A participant response system (50) comprises at least one host computer (52) and a plurality of battery-powered remote units (62) communicating wirelessly with the host computer (52). Each remote unit (62) executes a diagnostic routine in response to a received status request broadcast by the host computer (52) to detect the status thereof. Any remote unit (62) that detects an unhealthy state, returns health information to the host computer (52).

42 Claims, 9 Drawing Sheets

(56) References Cited

OTHER PUBLICATIONS

Office Action for Russian Patent Application No. 2009124546/08(034000) with a mailing date of Dec. 9, 2011.

Sep. 14, 2011 letter summarizing the second office action from the China Intellectual Property Office regarding Chinese Patent Application No. 200880002099.1, and the office action.
Mar. 31, 2012 Letter summarizing a Decision of Rejection for Chinese Patent Application No. 200880002099.1, and the decision.

* cited by examiner

PARTICIPANT RESPONSE SYSTEM EMPLOYING BATTERY POWERED, WIRELESS REMOTE UNITS

RELATED APPLICATIONS

This application claims the benefit of U.S. Provisional Patent Application Ser. No. 60/879,571 to Doerksen et al. filed on Jan. 10, 2007 entitled "Participant Response System Employing Battery Powered, Wireless Remote Units", the content of which is incorporated herein by reference.

FIELD OF THE INVENTION

The present invention relates generally to a participant response system comprising battery powered, wireless remote units that enable participants to respond to queries.

BACKGROUND OF THE INVENTION

Participant response systems for enabling participants of an event or assessment to enter responses to posed questions, motions or the like are well known in the art and have wide applicability. For example, during a conference, seminar or the like, participants can be provided with handsets that enable the participants to respond to questions, or to vote on motions raised during the conference or seminar. In the entertainment field, audience members can be provided with handsets that enable the audience members to vote for entertainment programmes or sporting events. These participant response systems are also applicable in the field of education. Students can be provided with handsets that enable the students to answer questions posed during lessons, tests or quizzes. Of significant advantage, these participant response systems provide immediate feedback to presenters, teachers, entertainment programme producers, or event organizers. With respect to the field of education, research shows that teachers teach better and students learn better when there is rapid feedback concerning the state of students' comprehension or understanding. It is therefore not surprising that such participant response systems are gaining wide acceptance in the field of education.

Participant response systems fall generally into two categories, namely wired and wireless participant response systems. In wired participant response systems, the remote units used by participants to respond to posed questions or to vote on motions are typically physically connected to a local area network and communicate with a base or host computer. In wireless participant response systems, the remote units used by participants to respond to posed questions or to vote on motions communicate with the host computer via wireless communication links. Whether wired or wireless, many different types of participant response systems have been considered.

For example, U.S. Pat. No. 2,465,976 to Goldsmith discloses a centercasting network system for polling public opinion by means of radio apparatus installed in numerous outlying voting stations. Groups of outlying voting stations communicate with associated central stations where votes that are obtained by the voting stations are counted or tabulated in accordance with any desired classification of votes. The voting stations gather and store voters' choices in a tangible medium. All of the voting stations within a given group then transmit the stored votes sequentially to the central station that serves the particular group. The total votes are stored at each central station until a master station transmits a start signal to the central station. The central station then transmits the results to the master station sequentially.

U.S. Pat. No. 3,858,212 to Tompkins et al. discloses a multi-purpose information gathering and distribution system comprising a central station having an omni-directional antenna for transmitting information queries to a plurality of remote stations and for gathering data acquired at the remote stations that is returned to the central station by the remote stations in response to the information queries. The remote stations are sequentially queried by the central station. In response to the information query, each remote station transmits the conditions at the remote station together with a remote identification code to the central station.

U.S. Pat. No. 4,247,908 to Lockhart, Jr et al. discloses a two-way communication system for use with a host computer that includes a control unit, a base station and multiple, handheld, portable radio/data terminal units. The control unit interfaces directly with the host computer but uses a radio link to interface with the portable radio/data terminal units. Each portable radio/data terminal unit includes a two-way radio and a data terminal. The data terminal includes a keyboard for data entry and an LED display for readout of either received data or locally generated data. The host computer initiates communication through polling and/or selection of portable radio/data terminal units via the control unit. The control unit, in response to a "poll" from the host computer, answers by sending either a previously received message from a portable radio/data terminal unit, or if no message has been received, a "no message" response. Polling by the control unit is an invitation to the portable radio/data terminal units to send data to the control unit to be stored, grouped if necessary and sent on to the host computer. The control unit polls the portable radio/data terminal units by address in a particular sequence. The control unit transmits acknowledgements to the portable radio/data terminal units for received data on the next polling cycle.

U.S. Pat. No. Re. 35,449 to Derks discloses a remote response system comprising a central control unit that transmits a plurality of distinct address words to remotely located response units and a receiver that receives data words transmitted from response units. Each response unit includes user operable data entry means and a receiver for receiving address words transmitted from the central control unit. Each response unit also includes circuit means for identifying an address word unique to the particular response unit and a transmitter for transmitting data words to the central control unit in response to identification of its unique address word. The central control unit comprises means for determining that a valid data word has been received from a response unit and for transmitting an acknowledge message to the response unit that sent the valid word. In response to the received acknowledge message, the particular response unit is conditioned to a second, or "off" mode. When a response unit has been placed in the "off" mode, the response unit will not respond to its address word again until a new user selection is made.

U.S. Pat. No. 5,002,491 to Abrahamson et al. discloses an interactive electronic classroom system for enabling teachers to teach students concepts and to receive immediate feedback regarding how well the students have learned the taught concepts. Structure is provided for enabling students to proceed in lockstep or at their own pace through exercises and quizzes, responding electronically to questions asked, the teacher being able to receive the responses, and to interpret a readout of student responses in histogram or other graphic display form. The electronic classroom comprises a central computer and a plurality of student computers, which range from simple devices to full fledged personal computers, connected to the central computer over a network. Optional peripheral hardware, such as video cassette recorders (VCRs) or other recording/reproducing devices, may be used to provide lessons to students in association with the computer network.

U.S. Pat. No. 5,724,357 to Derks discloses a wireless remote response system comprising a base unit which retrieves user-entered responses from a plurality of remote response units, each of which is provided to a user. The base unit transmits a base data package over a wireless communication link to the plurality of remote response units, which decode the base data packet and load into memory a portion of the decoded base data package at each response unit. Each response unit examines the characters loaded into the memory and determines and processes the characters that pertain to that particular response unit.

U.S. Pat. No. 6,302,698 to Ziv-El discloses a networked teaching and learning system comprising a plurality of student computers, a network server and at least one teacher's computer. The at least one teacher's computer includes comparison and evaluation logic in communication with the student computers for comparing and evaluating each student keystroke with the characters of an answer, if any, immediately after every student keystroke. The teaching and learning system provides character-by-character evaluation for quick learning feedback for students, as well as simultaneous observation at the teacher's computer of multiple student responses identified as correct or incorrect. The teaching and learning system enables quick construction of various exercise types, the scoring of unanticipated responses, and the introduction of an explanation component in addition to a direct response to a question.

U.S. Pat. No. 6,459,896 to Liebenow discloses a system and method for notifying a remote device of a low battery condition in a wireless communications system. A detector monitors the capacity of the battery in a wireless device receiving operational power from the battery for a low capacity condition. A control system coupled to the detector sends a low battery capacity status signal to the remote device upon detection of a low battery capacity condition. While the battery is in a low capacity condition, communications between the wireless device and the remote device may be maintained until the low battery capacity condition is corrected.

U.S. Pat. No. 6,790,045 to Drimmer discloses a method and system for analyzing student performance by classifying student performance into discrete performance classifications associated with corresponding activities related to an electronic course. An observed student performance level for at least one of the performance classifications is measured. A benchmark performance level or range is established for one or more of the performance classifications. It is then determined whether the observed student performance level is compliant with the established benchmark performance level for the at least one performance classification. Instructive feedback is determined for the observed student based upon any material deviation of the observed student performance from at least one benchmark.

U.S. Patent Application Publication No. 2003/0023681 to Brown et al. discloses a method and system for sharing electronic device information among multiple electronic devices participating in a messaging session. The electronic device information may include the type of the device, power level, signal strength etc. The electronic device information is filtered according to authorization preferences and the filtered electronic device information is distributed to the electronic devices participating in the messaging session. In this manner, each of the end users is enabled to monitor the electronic devices of other users during the messaging session.

U.S. Patent Application Publication No. 2004/0033478 to Knowles et al. discloses a participant response system comprising a plurality of wireless handsets assigned to participants of an event. Each handset has a keyboard for allowing a participant to input a response and has audio capability to allow the participant to receive and input audio. Each handset is configurable either as a participant response handset to allow a participant to enter a response, or as a base station.

U.S. Patent Application Publication No. 2004/0072136 to Roschelle et al. discloses a method and system for assessing a student's understanding of a process that may unfold over time and space. The system comprises thin client devices in the form of wireless, hand-held, palm-sized computers that communicate with a host workstation. The system provides a sophisticated approach of directing students to perform self-explanation, and enables instructors to enhance the value of this pedagogical process by providing meaningful and rapid feedback in a classroom setting.

U.S. Patent Application Publication No. 2004/0072497 to Buehler et al. discloses a response system and method of retrieving user responses from a plurality of users. The response system comprises a plurality of base units and a plurality of response units. Each of the response units is adapted to receive a user input selection and to communicate that user's input selection with at least one base unit utilizing wireless communication. Personality data is provided for the response units to facilitate communication with a particular base unit. The personality data of a particular response unit is changed when it is desired to change the base unit to which that response unit communicates. This allows a response unit to become grouped with a particular base unit at a particular time and to become grouped with another base unit at another particular time.

Although the above participant response systems provide teachers with immediate feedback concerning participant responses to posed queries, participant response systems of this nature can present some challenges. For example, with respect to participant response systems that employ wireless remote units, as will be appreciated, from a power standpoint, the wireless remote units are self sufficient and rely on on-board batteries, either rechargeable or non-rechargeable, to provide the necessary operating power. In general, but particularly in important situations, such as during tests or quizzes, it is important for a teacher or instructor to know whether any participant is using a remote unit that is low on power so that steps can be taken to ensure the participant is able to complete the test or quiz being administrated. Unfortunately, to-date participant response systems employing wireless remote units have not addressed this issue.

It is therefore an object of the present invention at least to provide a novel participant response system employing battery powered, wireless remote units.

SUMMARY OF THE INVENTION

Accordingly, in one aspect there is provided a participant response system comprising at least one host computer and a plurality of battery-powered remote units communicating wirelessly with the host computer. Each remote unit executes a diagnostic routine in response to a received status request broadcast by the host computer to detect the status thereof Any remote unit that detects an unhealthy state returns health information to the host computer.

In one embodiment, the status requests are broadcast by the host computer at intervals. Further, any remote unit that detects a healthy state also returns health information to the host computer. The host computer uses the returned health information to identify the remote units that are in an unhealthy state. The host computer may maintain a list of the remote units with the list being updated to identify the remote units that are in an unhealthy state. The host computer may also generate a prompt in response to returned health information identifying a remote unit that is in an unhealthy state. The prompt may be a pop-up window displayed on a monitor of the host computer or on the touch surface of an interactive whiteboard. The prompt in one embodiment is generated at the start of a significant event such as for example participant response system power up, the start of a diagnostic process or the start of an assessment.

In one embodiment, the health information returned by each remote unit that is in an unhealthy state comprises at least one of a low power message and a low signal strength message. In the case of a low power message, the low power message signifies a remote unit battery power level below a threshold value.

According to another aspect there is provided a participant response system comprising at least one host computer and a plurality of battery-powered remote units communicating wirelessly with the host computer. Each remote unit executes a diagnostic routine at regular intervals to detect the status thereof, and in response, at each interval, returns health information to the host computer.

According to yet another aspect there is provided a method of notifying a host computer of low battery conditions in hand-held wireless devices communicating with the host computer, comprising monitoring the status of the battery of each wireless device at regular intervals and at each interval, sending a battery status message from each wireless device to the host computer. Each battery status message identifies one of a normal battery condition and a low battery condition.

BRIEF DESCRIPTION OF THE DRAWINGS

Embodiments will now be described more fully with reference to the accompanying drawings in which.

DETAILED DESCRIPTION OF THE EMBODIMENTS

Figure 1:
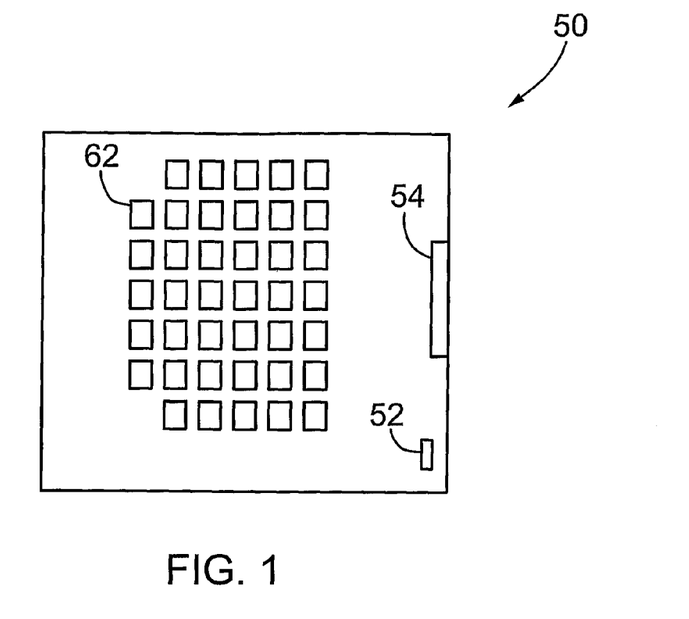
FIG. 1 is a top plan view of a classroom employing a participant response system.
Figure 2:
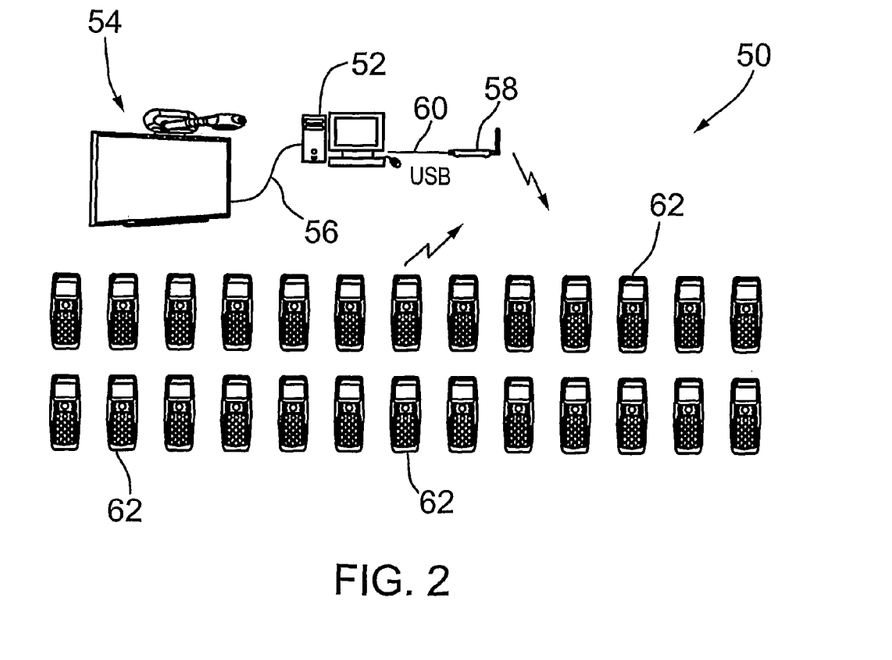
FIG. 2 is a schematic view of the participant response system of FIG. 1.

Turning now to FIGS. 1 and 2, a participant response system is shown and is generally identified by reference numeral 50. In this embodiment, participant response system 50 is employed in a classroom, lecture hall or theatre of an educational institution such as for example a school, university, college or the like and is used to create tests, quizzes or assessments ("tests"), administer created tests to a class of students and analyze the results of administered tests. As can be seen, the participant response system 50 comprises a base unit or host computer 52, an interactive whiteboard (IWB) 54 physically connected to the host computer 52 via a cable 56, a radio frequency (RF) receiver 58 physically connected to the host computer 52 via a universal serial bus (USB) cable 60, and a plurality of wireless, hand-held remote units 62 communicating with the host computer 52 over a wireless communications link via the receiver 58.

The participant response system firmware in this embodiment is implemented on top of IEEE802.15.4 media access control (MAC) protocol layer software provided by Texas Instruments (TI). The TI MAC protocol layer software comprises a small real-time kernel and a call Z-stack operating system (OS) to provide simple real-time OS facilities such as for example, timer management, task management and interrupt management. Abstraction layers are used to separate the OS and the hardware drivers for ease of porting to a different OS and hardware platform.

Figure 3:
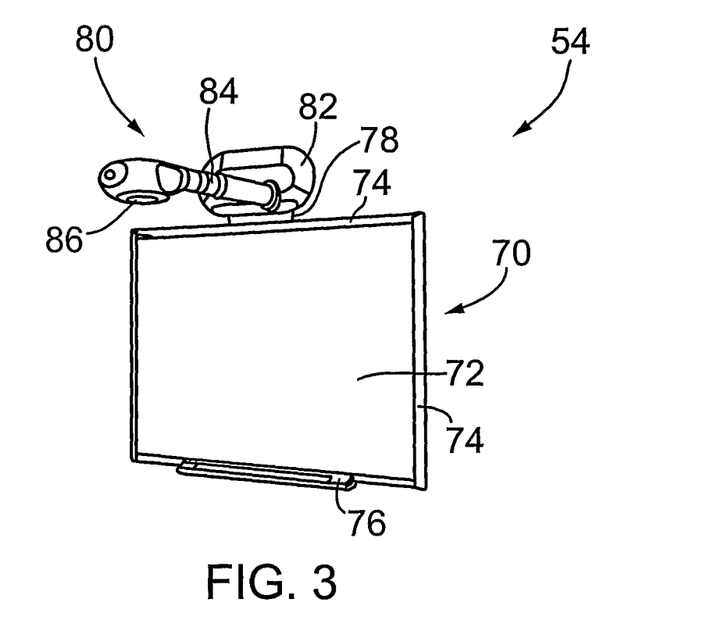
FIG. 3 is a schematic view of an interactive whiteboard forming part of the participant response system of FIGS. 1 and 2.

In this embodiment, the IWB 54 is a 600i series interactive whiteboard manufactured by SMART Technologies ULC, of Calgary, Alberta, Canada, assignee of the subject application. As is best seen in FIG. 3, the IWB 54 comprises a large, analog resistive touch screen 70 having a touch surface 72. The touch surface 72 is surrounded by a bezel 74. A tool tray 76 is affixed to the bezel 74 adjacent the bottom edge of the touch surface 72 and accommodates one or more tools that are used to interact with the touch surface. The touch screen 70 is mounted on a wall surface via a mounting bracket 78. A boom assembly 80 is also mounted on the wall surface above the touch screen 70 via the mounting bracket 78. The boom assembly 80 comprises a speaker housing 82 accommodating a pair of speakers (not shown), a generally horizontal boom 84 extending outwardly from the speaker housing 82 and a projector 86 adjacent the distal end of the boom 84. The projector 86 is aimed back towards the touch screen 70 so that the image projected by the projector 86 is presented on the touch surface 72.

Figure 4A:
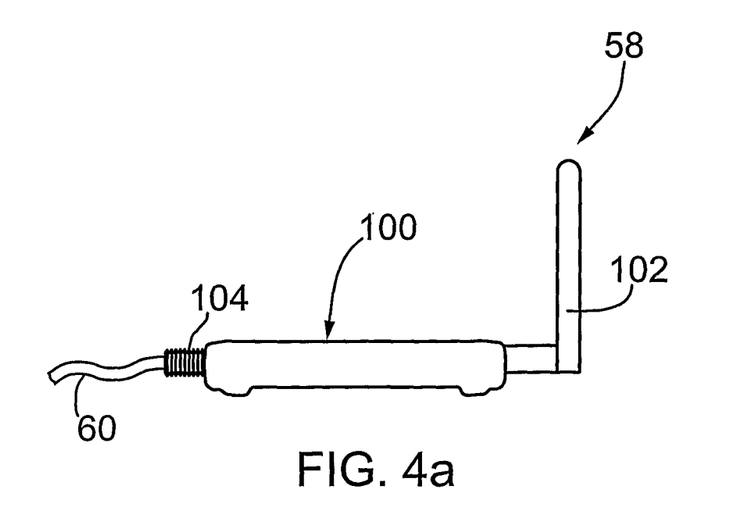
FIGS. 4a and 4b are side elevational and top plan views respectively, of a receiver forming part of the participant response system of FIGS. 1 and 2.
Figure 4B:
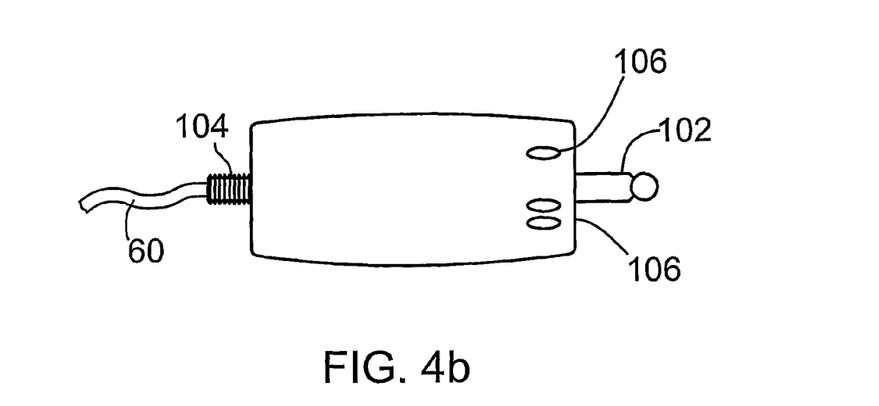
Figure 5:
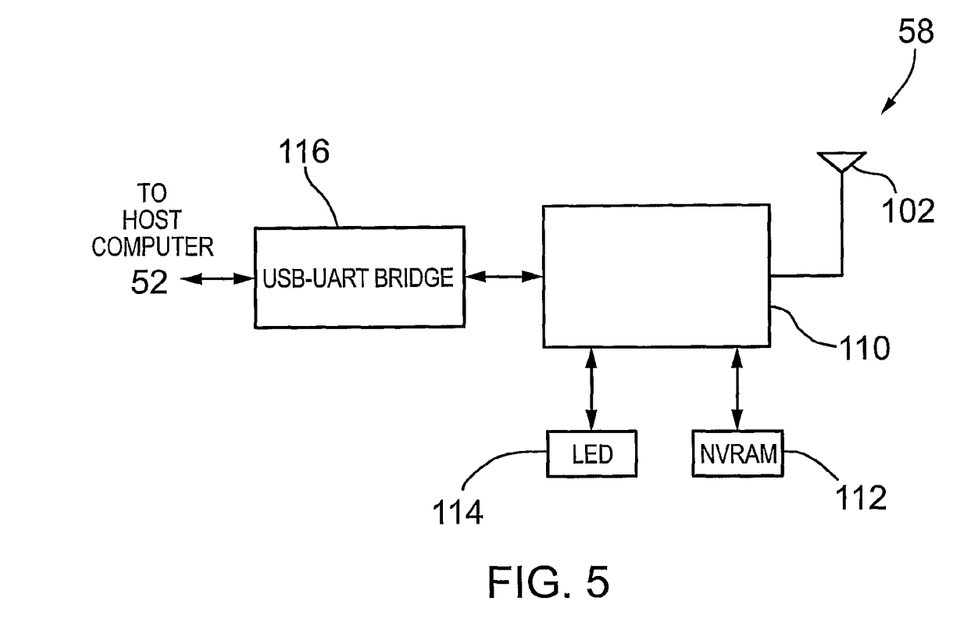
FIG. 5 is a schematic block diagram of the receiver of FIGS. 4a and 4b.

Turning now to FIGS. 4a, 4b and 5, the receiver 58 is better illustrated. As can be seen, the receiver 58 comprises a casing 100 adapted to be desktop or wall mounted. An L-shaped omni-directional antenna 102 is mounted on the front end of the casing 100. The rear end of the casing 100 receives the USB cable 60. A plurality of light emitting diodes (LEDs) 106 is provided on the top surface of the casing 100. During operation of the receiver 58, the LEDs 106 are illuminated to provide visual feedback concerning the operational status of the receiver 58. In this embodiment, the LEDs 106 comprise a power status LED and communications status LEDs. Alternatively, the receiver 58 may provide visual feedback via a display such as a liquid crystal display (LCD) or via both LEDs and an LCD. The receiver electronics are accommodated by the casing 100 and comprise a microprocessor 110 that communicates with non-volatile, random access memory (NVRAM) 112, an LED driver 114 and a USB-UART bridge 116. Power is provided to the receiver 58 via the USB cable connection 60.

Figure 6:
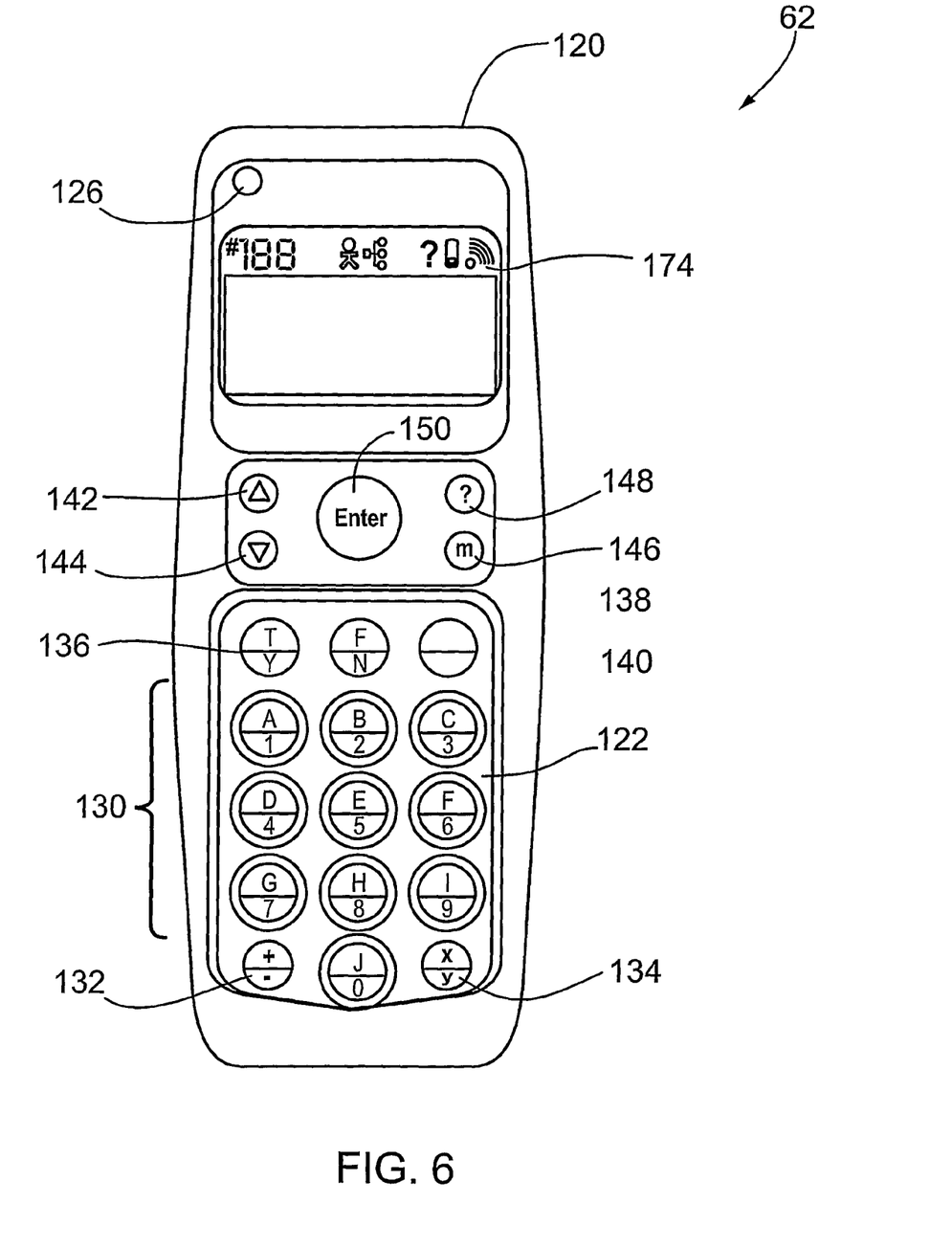
FIG. 6 is a front plan view of a remote unit forming part of the participant response system of FIGS. 1 and 2.
Figure 7:
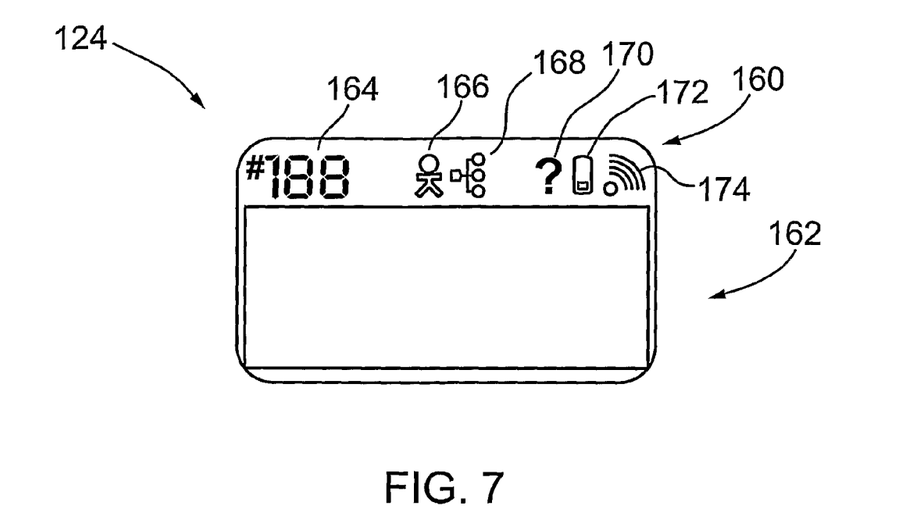
FIG. 7 is an enlarged front plan view of the remote unit display.
Figure 8:
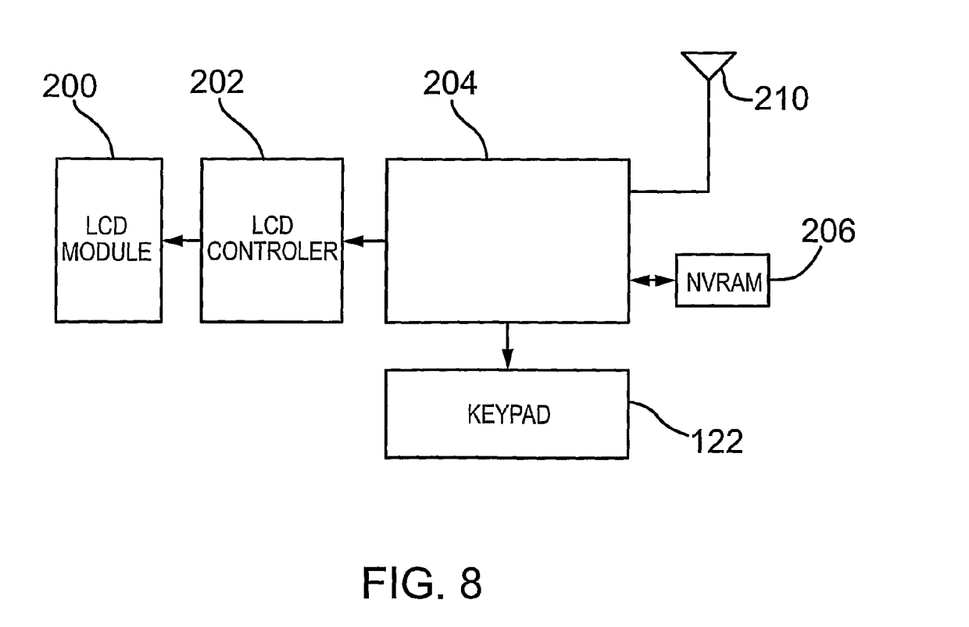
FIG. 8 is a schematic block diagram of the remote unit of FIG. 6.

One of the remote units 62 is best shown in FIGS. 6 to 8. As can be seen, the remote unit 62 comprises a casing 120 having a keypad 122, an LCD or other suitable display 124, a power button 126 and an optional battery status LED (not shown) on its front surface. In this embodiment, keypad 122 comprises ten (10) dual character (A to J/0 to 9) buttons 130, a plus/minus (+/−) button 132, a fraction/decimal ((x/y)/*) button 134, a true/yes (T/Y) button 136, a false/no (F/N) button 138, a delete (del) button 140, up and down scroll (ˆ/v) buttons 142 and 144, a menu button 146, a question/hands up (?) button 148 and an enter button 150. Those of skill in the art will appreciate that the form of the keypad 122 shown in FIGS. 6 to 8 is exemplary. The keypad may of course comprise an alternate set of keys, a full QWERTY or DVORAK key set or a subset thereof. If desired, the entire physical keypad 122 or a portion thereof may be replaced with a touch screen overlying the LCD display 124 to allow a user to interact with virtual keys.

The display 124 comprises an upper row of LCD icons 160 disposed above a character display area 162. The LCD icons 160 comprise a question number icon 164, a user status icon 166, a network status icon 168, a hands-up (?) icon 170, a battery status icon 172 and a transmission status icon 174. The character display area 162 comprises a 128×48 pixel array that is divided into three lines 180. Each line 180 can display a total of sixteen (16) characters. Remote unit electronics are accommodated by the casing 120 and comprise an LCD controller 200 that communicates with the display 124, an LCD driver 202 that drives the LCD controller 200, a microprocessor 204 that communicates with the LCD driver 202 and the keypad 122, as well as with NVRAM 206 and a printed circuit board, omni-directional antenna 210. Power is provided to the remote unit 62 by non-rechargeable or rechargeable batteries (not shown) accommodated by the casing 120.

Figure 9:
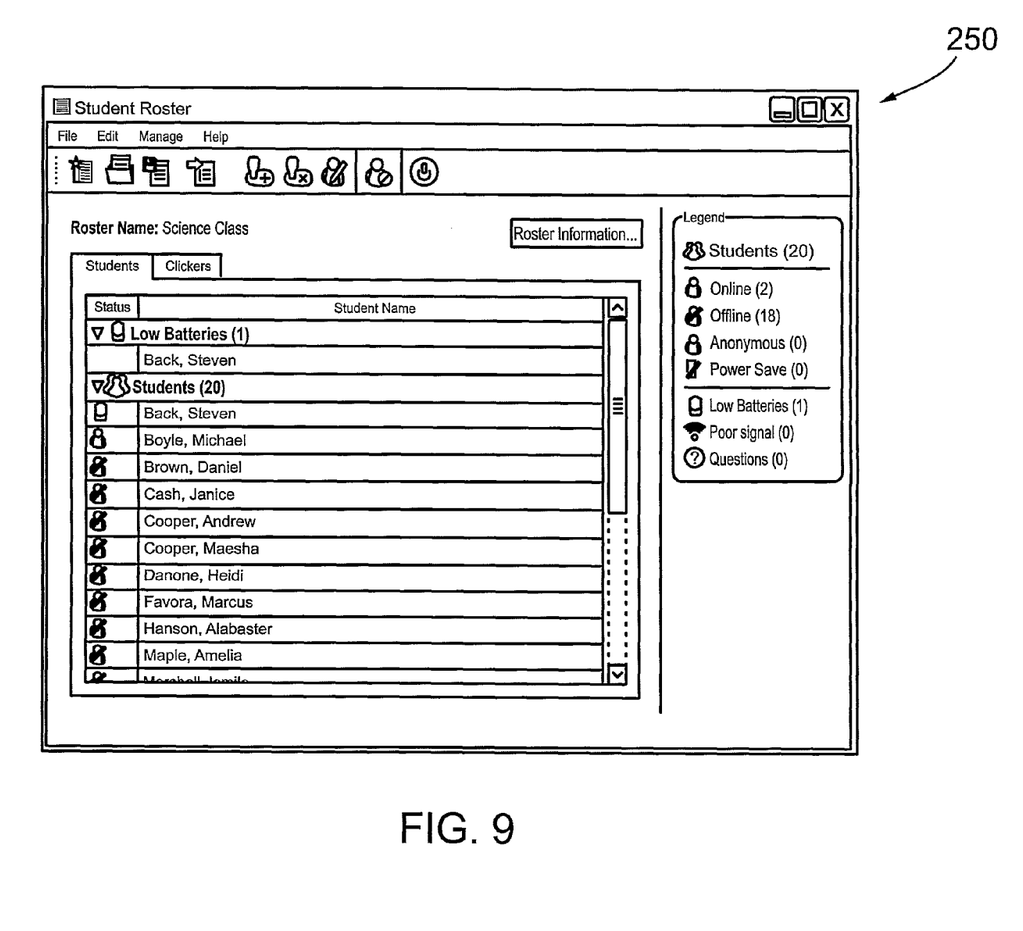
FIGS. 9 and 10 show a student roster.
Figure 10:
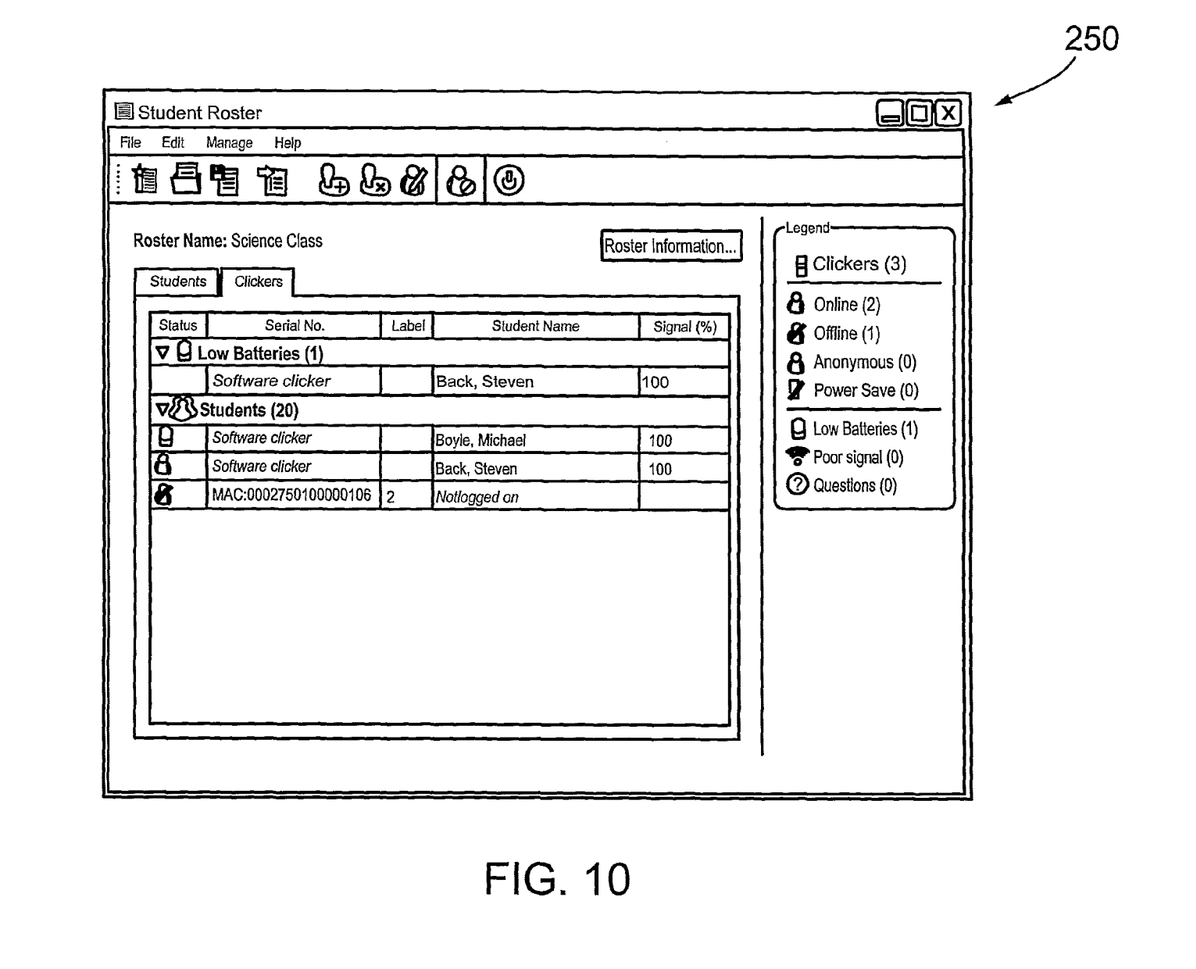

The host computer 52 runs participant response application software comprising a session manager that maintains the state of the participant response system 50. In particular, the session manager maintains a student roster 250 as shown in FIGS. 9 and 10. The student roster 250 identifies the class name, the students in the class by first and last name, the log-in status of the students and whether any of the logged-in students are using a remote device 62 that has a low battery level as will be described.

The session manager is responsible for downloading the question answer formats e.g. true/false, yes/no, multiple choice, numerical etc. for the questions of the test being administered, to the remote units 62, for receiving answers to questions input by students using the remote units 62 and for keeping track of the question each student is answering. The session manager is also responsible for aggregating answers to questions received from students into results, and grading the answers to the questions.

The host computer 52 also runs SMART Notebook™ whiteboarding software to facilitate interaction with the IWB 54. As a result, the display output of the host computer 52 is conveyed to the IWB 54 and is used by the projector 86 to present an image on the touch surface 72. Pointer interactions with the touch surface 72 are detected by the touch screen 70 and conveyed to the host computer 52. The display output of the host computer 52 is in turn adjusted by the host computer to reflect the pointer activity. The host computer 52 and IWB 54 thus form a closed-loop. Depending on the nature of the pointer activity, the host computer 52 may treat the pointer contacts as writing or erasing or may treat the pointer contacts as mouse events and use the mouse events to control execution of application programs, such as for example the participant response notebook application, executed by the host computer 52. In this manner, the IWB 54 can be used by the instructor to create and administer tests and to analyze test results.

In addition, the participant response application software comprises an administration application that provides a graphical user interface for the session manager to allow the instructor to define and refine test questions, create tests using defined questions, start and stop tests and visualize test results. The administration application also allows question definitions to be imported, allows responses, grades and results to be exported and allows tests to be printed together with answer keys. The administration application has two modes of operation, namely a Notebook integrated mode and a stand-alone mode. In the Notebook integrated mode, the administration application is integrated into the SMART Notebook™ software. The stand-alone mode is used when the participant response system 50 includes a different brand of IWB 54 or does not include an IWB.

In this embodiment as shown in FIG. 2, the host computer 52, IWB 54 and receiver 58 are physically connected by cables 56 and 60. Messages exchanged between the host computer 52, IWB 54 and receiver 58 are structured using extensible markup language (XML) over HTTP. The receiver 58 and the remote units 62 communicate over a wireless radio frequency (RF) communications network. The microprocessor 110 of the receiver 58 thus provides both a USB interface and an RF interface and runs a service that translates messages in USB protocol to messages in radio frequency (RF) wireless protocol and vice versa as well as runs IEEE802.15.4 MAC layer software to manage the IEEE802.15.4 network thereby to permit the host computer 52 and remote units 62 to communicate. Messages exchanged between the session manager and the receiver 58 comprise a header, a command identification, message bytes and a checksum. Consistent overhead byte stuffing is employed to provide frame delimiting of packets thereby to facilitate the determination of the start and end of command packets. Messages exchanged between the receiver 58 and the remote units 62 do not include the header and the checksum as the IEEE802.15.4 protocol is used to handle packet addressing and ensure packet integrity.

The messages exchanged between the session manager, the receiver 58 and the remote units 62 include diagnostic messages, status messages and command messages. For example, in this embodiment diagnostic messages comprise, but are not limited to, firmware information query messages, remote unit transmit power query messages and channel identification query messages. Status messages comprise, but are not limited to, remote unit status messages, network status messages and personal area network (PAN) ID messages. Command messages comprise, but are not limited to, log-in messages, log-out messages, log-in grant messages, question download messages, answer upload messages, hands-up messages, test start messages and test end messages.

In this embodiment, wireless communications between the host computer 52 and the remote units 62 are carried out according to the IEEE802.15.4 specification, as described in co-pending U.S. Patent Application No. (Not Available) to Lam entitled "Participant Response System With Reduced Communications Bandwidth" filed on even date herewith and assigned to the assignee of the subject application, the content of which is incorporated herein by reference. As a result, data messages to be processed by all of the remote units 62 are transmitted in general broadcast beacon frames that are received by all of the remote units. Data messages to be processed by selected remote units 62 are transmitted in message frames addressed to those selected remote units that are sent during the intervals between beacon frames. Of course, communications between the host computer 52 and the remote units 62 can be carried out using other suitable communications protocols.

Figure 11:
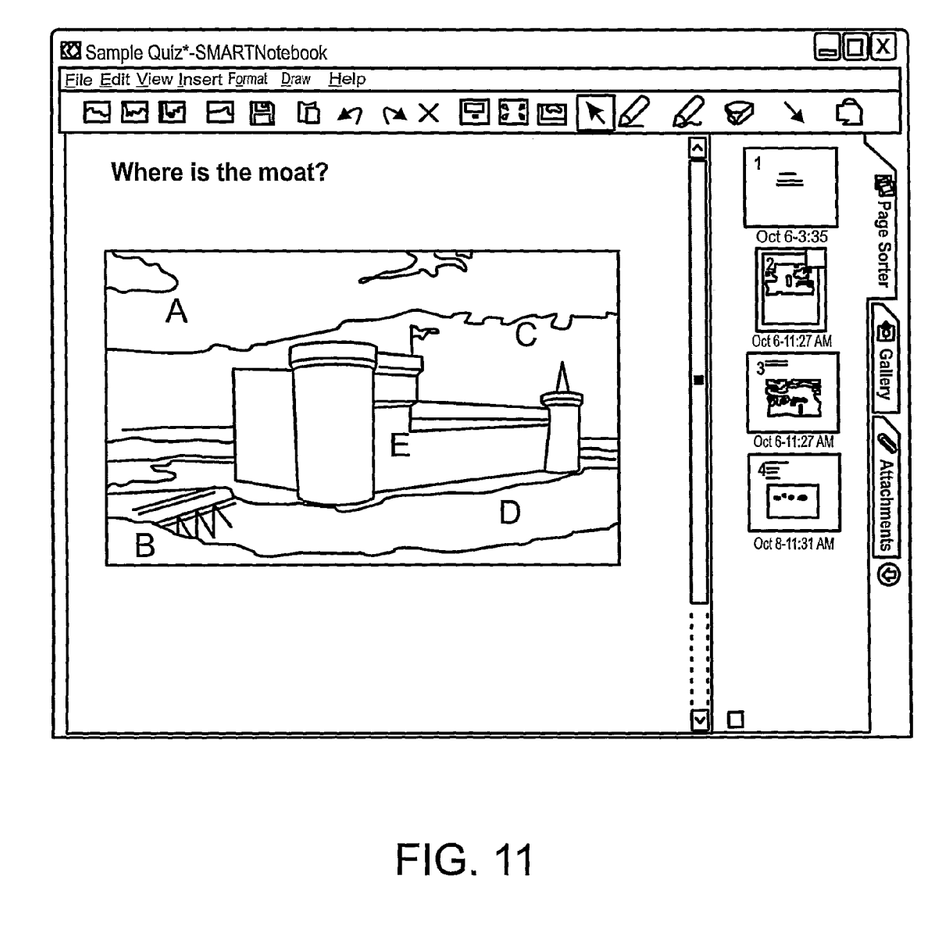
FIG. 11 shows a test question displayed on the touch surface of the interactive whiteboard of FIG. 3.

When a test is being administered to students, the session manager generates one or more question download messages that include the question answer formats for the questions of the test. The question download messages are then sent to the receiver 58, which in turn embeds the question download messages in the next beacon frame and broadcasts the beacon frame embodying the question download messages to all of the remote units 62 simultaneously. Upon receipt of the beacon frame, each active remote unit 62 in turn loads the question download messages into memory 206. The student associated with each remote unit 62 can then use the scroll buttons 142 and 144 to select the question to which the student wishes to respond so that the question answer format for the selected question is displayed. The host computer 52 also provides display data to the IWB 54 resulting in the projector 78 projecting the questions of the test on the touch surface 72 of the touch screen 70. In this embodiment, each question is displayed on the touch surface 70 independently as shown in FIG. 11 thereby to facilitate viewing by the students.

When the question is a true/false type question, the question answer format corresponding to the question that is displayed by the remote units 62 provides true and false selections. In this case, the question can be answered using either the true/yes button 136 or the false/no button 138. Likewise, when the question is a yes/no type question, the question answer format corresponding to the question that is displayed by the remote units 62 provides yes and no selections. In this case, the question can be answered using either the true/yes button 136 or the false/no button 138. When the question is a multiple choice or numeric type question, the question answer format corresponding to the question that is displayed by the remote units 62 provides choice selections or a line for the numeric answer. In this case, the question can be answered using the dual character buttons 130, the +/− button 132 and/or fraction/decimal button 134.

When an answer has been input into a remote unit 62 via the keypad 122 and the enter button 150 has been pressed, the remote unit 62 generates an answer upload message that includes the question number and the student's answer and sends the answer upload message in a message frame to the receiver 58. Upon receipt of the message frame, the receiver 58 passes the answer upload message to the host computer 52. The session manager in turn saves the answer upload message and analyzes the answer thereby to provide results to the administration application.

If desired, the processing capabilities of the remote units 62 can be utilized to grade input answers. In this situation, in addition to command download messages, answer download messages are conveyed to the remote units 62. When a user inputs an answer to a question, the remote unit 62 compares the input answer with the corresponding answer download message and generates an answer upload message comprising one of two values signifying either a correct or incorrect response. As a result, some of the computing load is transferred to the remote units 62 reducing the processing burden placed on the host computer 52.

As will be appreciated, at any given time, one or more of the remote units 62 may have a low power condition. Moreover, during the test, a remote unit 62 used by a student may become inoperable due to a lower power condition or other failure. To provide the instructor with advance warning of remote unit low power conditions, the session manager run by the host computer 52 generates a remote unit status message at intervals that is conveyed to the receiver 58. Upon receipt, the receiver 58 embeds the remote unit status message into the next beacon frame and broadcasts the beacon frame to all of the remote units 62. When a remote unit 62 receives a beacon frame with the remote unit status message, the microprocessor 204 runs a diagnostic check to determine if the power level of the batteries therein is greater than or equal to a threshold level. If the power level is greater than or equal to the threshold level, the remote unit 62 generates a battery normal message and transmits a message frame including the battery normal message to the host computer 52. If the power level is less than the threshold level, the remote unit 62 generates a battery low message and transmits a message frame including the battery low message to the host computer 52.

Figure 12:
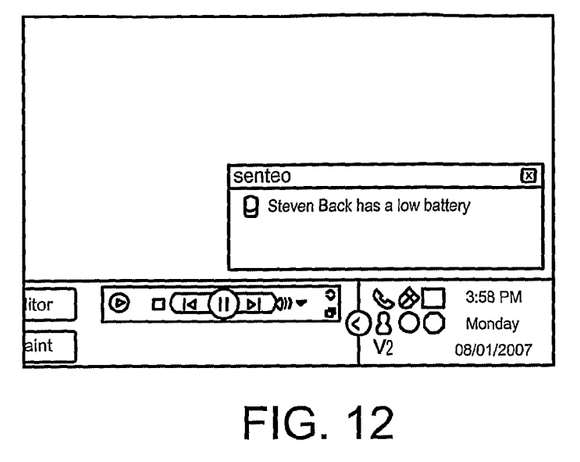
FIG. 12 is a pop-up notification displayed on the touch surface of the interactive whiteboard of FIG. 3 signifying a remote unit low battery condition.

Upon receipt of the reply message frame from each remote unit 62 via the receiver 58, the session manager run by the host computer 52 examines the received message to detect the existence of a battery low message. If a battery low message is detected, the session manager updates the student roster 250 to identify the remote unit as having a low battery condition. Optionally, the session manager generates a prompt such as for example a pop-up notification for display on the touch surface 72 or on the monitor of the host computer 52 as shown in FIG. 12, an audible signal or other suitable prompt to warn of the remote unit low battery condition.

Figure 13A:
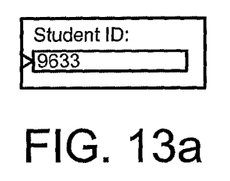
FIGS. 13a to 13e show information presented on the character display area of a remote unit when a replacement remote unit is given to a student participating in a test or quiz.
Figure 13B:
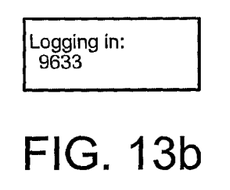
Figure 13C:
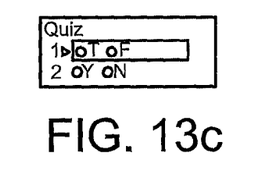
Figure 13D:
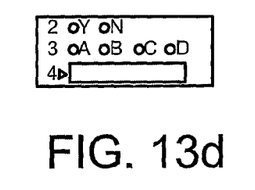
Figure 13E:
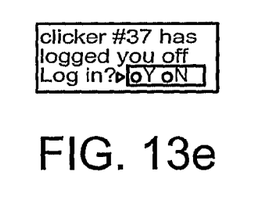

In such a low battery situation, if a replacement remote unit is given to the student, the student must complete the log-in procedure using the replacement remote unit by entering their student ID number as shown in FIG. 13*a*. When the student ID number is entered, the remote unit 62 transmits a message frame comprising a log-on message that is conveyed to the host computer 52 by the receiver 58 as shown in FIG. 13*b*. The host computer 52 in turn returns a message frame comprising a log-in grant message that is broadcast by the receiver 58 to the remote unit 62. Upon receipt of the log-on message, the host computer 52 also identifies that the participant had previously been logged in using another remote unit 62. The host computer 52 then examines the answers previously recorded for the student, if any, and transmits the question download command message and any prior submitted answers to the remote unit 62. The first unanswered question of the test is presented on the display screen allowing the student to resume the test at the point where the student left off (see FIGS. 13*c* and 13*d*). The host computer 52 also sends a message frame comprising a log-off message to the remote unit previously used by the student thereby to inhibit a student from answering test questions using multiple remote units as shown in FIG. 13*e*.

Alternatively, if the student is given replacement batteries to place in the remote unit 62 to deal with the low battery situation, after the student has replaced the batteries in the remote unit, the student must complete the log-in procedure by entering their student ID number as shown in FIG. 13*a*. When the student ID number is entered, the remote unit transmits a message frame comprising the log-on message as shown in FIG. 13*b*. The host computer 52 in response to the log-on message returns a message frame comprising a log-in grant message that is broadcast by the receiver 58 to the remote unit 62. Upon receipt of the log-on message, the host computer 52 examines the answers previously recorded for the student, if any, and transmits a message frame comprising the question download message and any prior submitted answers to the remote unit 62. The question answer format for the first unanswered question of the test is presented on the display screen allowing the student to resume the test at the point where the student left off.

If desired, each remote unit 62 may comprise circuitry to monitor the battery level such that when the remote unit receives the remote unit status message, in response, the remote unit 62 transmits data representing the actual battery level. When the battery level data is received by the host computer 52 via the receiver 58, the session manager processes the battery level data and conditions the administration application to display a bar graph or other visual indicator that represents the battery level of the remote unit 62.

Furthermore, the remote units 62 may transmit other health information to the host computer 52 in response to the remote unit status message, such as for example signal strength data or stuck key data. This other health information may be in addition to the battery status message (i.e. battery normal message, battery low message or battery level data) or in replacement of the battery status message. The health information returned by the remote units 62 may be sent to the host computer 52 directly or indirectly such as for example via another remote unit 62.

If desired, generation of prompts such as the pop-up windows for display on the IWB 54 or monitor of the host computer 52 can be controlled so that the pop-up windows are only generated at particular times such as at the start of significant events. For example, during initial power up of the participant response system 50, at the start of a diagnostic process and/or at the start of a test or assessment when remote unit status messages are broadcast, for each remote unit 62 returning a battery low message, pop-up notifications are displayed. At other non-critical times, in response to received battery status messages, the session manager updates the student roster 250 to identify each remote unit 62 with a low power condition but no pop-up notifications or other prompts are generated.

Although the remote units 62 are described as providing battery level status information to the host computer 52 in response to broadcast remote unit status messages, if desired, the remote units 62 can be programmed to transmit the battery level status information to the host computer 52 at intervals without prompting.

The participant response system configuration specifics described above are exemplary and as will be appreciated by those of skill in the art, variations are possible. For example, the receiver 58 and remote units 62 can communicate according to the ZigBee specification. The receiver 58 and the host computer 52 can communicate over other wired communication links such as RS-232 or Ethernet connections or over a wireless communication link. Alternatively, the receiver 58 may be integrated into the host computer 52 such that the host computer 52 and remote units 62 communicate directly over a wireless communication link via a compatible wireless protocol such as for example Zigbee, Z-Wave, ANT, IEEE802.11b/g/n or Bluetooth™.

Although a particular form of remote unit 62 is illustrated and described, those of skill in the art will appreciate that the remote units may take a variety of forms. For example, the remote units 62 may be cellular phones, personal digital assistants (PDAs), ultra-mobile personal computers, laptop computers or other suitable devices that allow users to input responses to questions. Of course, combinations of the above devices are permissible so that each user is not required to use the same input device.

Although the IWB 54 is described as including an analog resistive touch screen 70, those of skill in the art will appreciate that other types of touch screens, such as for example camera-based, surface acoustic wave, capacitive, electromagnetic etc. touch screens may be used. Alternatively, the questions can be projected onto a non-interactive display surface or delivered to students on handouts. In either case, the instructor interacts with the administration application via the monitor of the host computer 52.

Those of skill in the art will appreciate that although a single classroom employing the participant response system 50 has been shown, in a typical education environment, participant response systems are employed in many, if not all classrooms of the educational institution. Of course, the participant response system 50 may be used in other environments where individuals are required to input responses to be processed.

As described above, the participant response system provides for various advantages that achieve greater operability and user-friendliness. For example, one of the advantages is that all questions and answers are preferably broadcast from the teacher to the students. Logged-in students will thus receive the test and answers. Each student can then work at his/her own pace, and that pace is preferably not controlled by the teacher. Preferably, the teacher cannot set software-controlled time limits for responses from either the whole class or from an individual student, so each student can advance at a comfortable pace. Furthermore, since the students preferably cannot provide narrative responses, tests will be more efficiently conducted. Another advantage is that the participant response system 50 preferably does not allow the student to operate more than one interactive program at a time. This keeps the student's attention focused on the test at hand. Further, the remote units 62 preferably do not decode a teacher data packet that includes a plurality of characters, a portion of which pertain to different remote units. Also, since the IEEE802.15.4 specification is used, which implements a direct sequence spread spectrum modulation scheme, the communication link from the teacher is not subject to variation in timing between the rising and falling edges of the signal. Thus, the remote units 62 are less susceptible to interference and RF noise.

Furthermore, the host computer 52 persistently stores partial test results until the entire test is complete. Preferably, an open session between students and teacher is maintained until the test is complete. In no case is information from one test section included in information regarding another test section transmitted to the teacher. This gives each student greater flexibility in responding to the test, and increases the robustness of the communication protocol. In the participant response system 50, preferably, the remote units 62 do not immediately transmit each student keystroke of a multi-character response without waiting for the next keystroke. The entire response is sent when completed. Preferably, the participant response system 50 cannot be used in a multi-teacher environment, to avoid confusion in which the teacher has control over the test. Also, when authoring a test, the teacher does not place answers in an answer buffer, does not strip answers from a message, and does not leave a designated blank space in place of each answer or selected character.

In the participant response system 50, the remote units 62 do not store an application-specific text file, and they are not programmed to be used for a plurality of different applications solely by modifying such an application-specific text file. Likewise, the remote units 62 do not have any structure or function for identifying a particular one address word (assigned to that particular remote unit) from a list of address words sequentially broadcast by the teacher; nor does the host computer 52 have any structure or function for performing such a broadcast. These provisions allow greater flexibility in the tests the teacher can author and administer in the network communications structure and test distribution architecture.

Although embodiments have been described above with reference to the accompanying drawings, those of skill in the art will appreciate that variations and modifications may be made without departing from the spirit and scope thereof as defined by the appended claims.

What is claimed is:

1. A participant response system for remote unit diagnostics during an assessment, the participant response system comprising:
    an interactive whiteboard comprising a touch surface on which said assessment is displayed;
    at least one host computer running said assessment and communicating with said interactive whiteboard; and
    a plurality of battery-powered, handheld remote units communicating wirelessly with said at least one host computer, each said remote unit configured to display assessment queries, to receive user input responsive to said assessment queries and to transmit received user input to said at least one host computer, each said remote unit further configured to execute a diagnostic routine in response to a received status request broadcast by said at least one host computer in a general broadcast beacon frame directed to all said remote units to detect the status thereof, any remote unit detecting an unhealthy state returning health information to said host computer.

2. The participant response system according to claim 1 wherein status requests are broadcast by said at least one host computer at intervals.

3. The participant response system according to claim 2 wherein each remote unit detecting a healthy state also returns health information to said at least one host computer.

4. The participant response system according to claim 1 wherein said at least one host computer uses said returned health information to identify remote units that are in an unhealthy state.

5. The participant response system according to claim 4 wherein said host computer maintains a list of said remote units, said list being updated to identify said remote units that are in an unhealthy state.

6. The participant response system according to claim 4 wherein said at least one host computer generates a prompt in response to returned health information identifying each remote unit that is in an unhealthy state.

7. The participant response system according to claim 6 wherein said prompt is a pop-up window displayed on a monitor of said at least one host computer.

8. The participant response system according to claim 6 wherein said prompt is a pop-up window displayed on said interactive whiteboard.

9. The participant response system according to claim 8 wherein said pop-up window is also displayed on a monitor of said at least one host computer.

10. The participant response system according to claim 6 wherein said prompt is selectively generated.

11. The participant response system according to claim 10 wherein said prompt is generated at the start of a significant event.

12. The participant response system according to claim 11 wherein said significant event is at least one of participant response system power up, the start of a diagnostic process and the start of said assessment.

13. The participant response system according to claim 1 wherein the health information returned by remote units that are in an unhealthy state comprises at least one of a low power message and a low signal strength message.

14. The participant response system according to claim 13 wherein said health information returned by remote units that are in an unhealthy state comprises a low power message.

15. The participant response system according to claim 14 wherein said low power message signifies a remote unit battery power level below a threshold value.

16. The participant response system according to claim 1 wherein health information returned by one or more of said remote units is sent directly to said at least one host computer.

17. The participant response system according to claim 1 wherein health information returned by one or more of said remote units is sent indirectly to said at least one host computer.

18. A participant response system for remote unit diagnostics during an assessment, the participant response system comprising:
    an interactive whiteboard comprising a touch surface on which said assessment is displayed;
    at least one host computer running said assessment and communicating with said interactive whiteboard; and
    a plurality of battery-powered, handheld remote units communicating wirelessly with said host computer, each said remote unit configured to display assessment queries, to receive user assessment response input and to transmit received user assessment response input to said at least one host computer, each said remote unit further configured to execute a diagnostic routine at regular intervals in response to status requests broadcast by said at least one host computer in general broadcast beacon frames addressed to all remote units to detect the status thereof, and in response at each interval returning health information to said at least one host computer.

19. The participant response system according to claim 18 wherein said at least one host computer uses said returned health information to identify the remote units that are in an unhealthy state.

20. The participant response system according to claim 19 wherein said at least one host computer maintains a list of the remote units, the list being updated to identify the remote units that are in an unhealthy state.

21. The participant response system according to claim 19 wherein said at least one host computer generates a prompt in response to returned health information identifying each remote unit that is in an unhealthy state.

22. The participant response system according to claim 21 wherein said prompt is a pop-up window displayed on a monitor of said at least one host computer.

23. The participant response system according to claim 21 wherein said prompt is a pop-up window displayed on said interactive whiteboard.

24. The participant response system according to claim 23 wherein said pop-up window is also displayed on a monitor of said at least one host computer.

25. The participant response system according claim 21 wherein said prompt is selectively generated.

26. The participant response system according to claim 25 wherein said prompt is generated at the start of a significant event.

27. The participant response system according to claim 26 wherein said significant event is at least one of participant response system power up, the start of a diagnostic process and the start of said assessment.

28. The participant response system according to claim 18 wherein said health information returned by remote units that are in an unhealthy state comprises at least one of a low power message and a low signal strength message.

29. The participant response system according to claim 28 wherein said health information returned by remote units that are in an unhealthy state comprises a low power message.

30. The participant response system according to claim 29 wherein said low power message signifies a remote unit battery power level below a threshold value.

31. The participant response system according to claim 18 wherein health information returned by one or more of said remote units is sent directly to said at least one host computer.

32. The participant response system according to claim 18 wherein health information returned by one or more of said remote units is sent indirectly to said at least one host computer.

33. A method of notifying a host computer of low battery conditions in hand-held wireless devices communicating with said host computer during an assessment, the method comprising:
    displaying an assessment on a touch surface of an interactive whiteboard;
    receiving, from said wireless devices at the host computer, assessment answers entered by users of said wireless devices;
    monitoring the status of a battery of each wireless device at regular intervals during the assessment in response to status requests broadcast by the host computer in general broadcast beacon frames directed to all wireless devices; and
    at each interval, sending a battery status message from each wireless device to said host computer, each battery status message identifying one of a normal battery condition and a low battery condition.

34. The method of claim 33 further comprising displaying a prompt identifying each remote unit sending a battery status message to said host computer that identifies said low battery condition.

35. The method of claim 34 wherein said prompt is a pop-up window.

36. The method of claim 35 wherein said pop-up window is displayed only at times signifying significant events.

37. The method of claim 33 further comprising prior to said monitoring, broadcasting status requests by said host computer at said regular intervals and in response to said status requests, performing said monitoring.

38. A participant response system for remote unit replacement during an assessment, said participant response system comprising:
    at least one host computer; and
    a plurality of battery-powered, handheld remote units communicating wirelessly with said at least one host computer in a communication session, each of said remote units configured to display assessment queries, to receive user input responsive to said assessment queries and to transmit received user input to said at least one host computer;
    wherein said at least one host computer is configured to:
        receive a request from a new remote unit to join said communication session;
        determine that said new remote unit is a replacement of one of said plurality of remote units in said communication session; and
        transfer to said new remote unit data associated with said one of the said plurality of remote units being replaced, said data comprising assessment data.

39. The participant response system in claim 38, wherein said assessment data comprises:
    queries associated with said assessment; and said received user input responsive to at least some of said queries, said received user input previously received from said one of the said plurality of remote units being replaced.

40. The participant response system in claim 39, wherein said new remote unit is configured to continue said assessment by displaying a first unanswered one of said queries.

41. The participant response system in claim 38, wherein said at least one host computer determines that said new remote unit is a replacement of one of said plurality of remote units by determining that a participant identified in a log-on message received from said new remote unit matches a participant identified in a log on-message received from said one of said plurality of remote units in said communication session.

42. The participant response system in claim 41, wherein said at least one host computer is further configured to transmit a log-off message to said one of said plurality of remote units in said communication session.

* * * * *